United States Patent [19]

Bock et al.

[11] 4,277,381
[45] Jul. 7, 1981

[54] PROCESS FOR THE FORMATION OF ELASTOMERIC BLENDS OF A SULFONATED ELASTOMERIC POLYMER

[75] Inventors: Jan Bock, Bridgewater; Henry S. Makowski, Scotch Plains; Robert D. Lundberg, Bridgewater, all of N.J.

[73] Assignee: Exxon Research & Engineering Co., Florham Park, N.J.

[21] Appl. No.: 22,977

[22] Filed: Mar. 23, 1979

Related U.S. Application Data

[63] Continuation-in-part of Ser. No. 855,726, Nov. 29, 1977, abandoned.

[51] Int. Cl.$^3$ ............................................. C08L 91/00
[52] U.S. Cl. ........................... 260/23.5 A; 260/23.7 B; 260/27 BB; 260/30.6 R; 260/31.2 R; 260/33.6 AQ; 260/DIG. 31
[58] Field of Search ............... 260/33.6 AQ, 33.6 PQ, 260/42.33, 42.47, 23.5 A, 23.7 B, 27 BB, 31.2 R, DIG. 31, 30.6 R, 32.6 A

[56] References Cited

U.S. PATENT DOCUMENTS

| | | | |
|---|---|---|---|
| 3,642,728 | 2/1972 | Canter | 260/896 |
| 3,779,974 | 12/1973 | Hubbard et al. | 260/29.7 B |
| 3,870,841 | 3/1975 | Makowski et al. | 260/23.7 M |
| 3,887,530 | 6/1975 | O'Farrell et al. | 260/42.47 |
| 3,974,241 | 8/1976 | Lundberg et al. | 260/28.5 R |
| 4,158,653 | 6/1979 | Chung | 260/33.6 AQ |

*Primary Examiner*—Lewis T. Jacobs
*Attorney, Agent, or Firm*—Richard E. Nanfeldt

[57] ABSTRACT

This invention relates to a process for the manufacture of a blend composition of a neutralized sulfonated ethylene propylene terpolymer (EPDM) which includes the steps of sulfonating the EPDM dissolved in a solvent to form an unneutralized sulfonated elastomeric polymer. The solution of the unneutralized sulfonated EPDM is quenched with an aliphatic alcohol. The unneutralized sulfonated elastomeric polymer in solution is then neutralized with a neutralizing agent to form the neutralized sulfonated EPDM in solution. A critically selected non-polar backbone process oil is added under agitation to the solution thereby plasticizing the neutralized sulfonated EPDM with the process oil. The neutralized sulfonated EPDM plasticized with the process oil is then recovered from the solution.

25 Claims, No Drawings

PROCESS FOR THE FORMATION OF ELASTOMERIC BLENDS OF A SULFONATED ELASTOMERIC POLYMER

CROSS-REFERENCE TO RELATED APPLICATIONS

This application is a continuation-in-part application of Ser. No. 855,726, filed Nov. 29, 1977, now abandoned.

BACKGROUND OF THE INVENTION

1. Field of the Invention

This invention relates to a process for the manufacture of a blend composition of a neutralized sulfonated ethylene propylene terpolymer (EPDM) which includes the steps of sulfonating the EPDM dissolved in a solvent to form an unneutralized sulfonated elastomeric polymer. The solution of the unneutralized sulfonated EPDM is quenched with an aliphatic alcohol. The unneutralized sulfonated elastomeric polymer in solution is then neutralized with a neutralizing agent to form the neutralized sulfonated EPDM in solution. A critically selected non-polar backbone process oil is added under agitation to the solution thereby plasticizing the neutralized sulfonated EPDM with the process oil. The neutralized sulfonated EPDM plasticized with the process oil is then recovered from the solution.

2. Description of the Prior Art

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer at room temperature having substantially improved physical properties over an unsulfonated elastomer. However, these sulfonated elastomers, unlike their covalently cross-linked unsulfonated counterparts, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

These aforementioned patents use the same process for the incorporation of either the domain, or polymer chain plasticizer into the neutralized sulfonated elastomeric polymer. This process includes the fluxing of the crumb of the neutralized sulfonated elastomeric polymer on a hot two roll mill. The plasticizer is then added to the hot flux of the neutralized sulfonated elastomeric polymer and mixing is continued until a homogeneous mixture has been obtained. The plasticized sulfonated elastomeric polymer is removed from the mill and ground or diced into a plurality of discrete particles. The process of the present invention overcomes many of the inherent disadvantages of this previously employed process. For example, a large amount of thermal energy is required to flux the neutralized sulfonated elastomeric polymer on the two roll mill. In the present process, there is no requirement for thermal energy input. In the previously employed batch type process, at least two men were required for a substantial period of time, wherein the neutralized sulfonated elastomeric polymer was twice isolated in particle form—namely, as the crumb and as the ground discrete particle. The continuous type process of the present invention eliminates the need for a double isolation of the neutralized sulfonated elastomeric polymer in the particle form. Furthermore, in the present process there is a substantial reduction in the required manhours for plasticization of the neutralized sulfonated elastomeric polymer.

Additionally, in the present process a more uniform dispersion of the plasticizer into the neutralized sulfonated elastomeric polymer is realized due to the increased mobility of both the process oil and the neutralized sulfonated elastomeric polymer in solution thereby allowing a more complete molecular homogeneity of the backbone chains of the oil and polymer. For example, it is extremely difficult to flux on a mill a neutralized sulfonated elastomeric polymer having a viscosity at 200° C. at 0.74 $sec^{-1}$ of about $5 \times 10^5$ to about $1 \times 10^7$ poises. In order to flux this polymer an excessive amount of shear and thermal energy is required. This shear tends to mechanically cleave the polymer chains resulting in a reduction in molecular weight and an alteration of molecular weight distribution. Sufficient reduction in molecular weight will have a detrimental effect on the resulting physical properties of the product. Even in the fluxed state, the viscosity of the polymer is extremely high thereby resulting in limited mobility of the polymer chains which results in an inferior dispersion of the process oil into the polymer whereas by the solution process of the present invention, an improved dispersion is realized due to increased mobility of the polymer chains in solution.

SUMMARY OF THE INVENTION

It has now been surprisingly found that an improved distribution of a critically selected process oil into a neutralized sulfonated elastomeric polymer can be achieved by an improved process of manufacturing. While the resulting compositions can be relatively soft, surprisingly the cold flow behavior is excellent. The compositions can thus be manufactured in a crumb or granulated form which is desirable for subsequent corresponding operations.

The improved blend compositions of a process oil and a neutralized sulfonated elastomeric polymer have both improved physical and rheological properties.

GENERAL DESCRIPTION OF THE PRESENT INVENTION

This present invention relates to an improved solution process for the incorporation of a critically selected process oil into a neutralized sulfonated elastomeric polymer thereby resulting in blend compositions of the sulfonated elastomeric polymer and process oil which have unique physical and rheological properties.

The elastomeric polymers of the present invention are derived from synthetic polymers having olefinic unsaturation sites, wherein the polymer has from about 0.1 to about 10.0 mole percent olefinic unsaturation. The unsaturation sites can be in the polymer backbone, pendant therefrom or cyclic, except that aromatic containing polymers are excluded from this description.

In particular, the unsaturated polymers, of this present invention are preferably EPDM terpolymers. A less preferred sulfonated elastomer polymer is sulfonated Butyl rubber; however, the kind of oils as well as degree of incorporation of oil into the sulfonated Butyl rubber has to be modified due to differences between the sulfonated Butyl rubber and sulfonated EPDM terpolymers.

The term "EPDM" is used in the sense of its definition as found in ASTM D-1418-64 and is intended to mean a terpolymer containing ethylene and propylene in the backbone and a diene in the side chain. Illustrative methods for producing these terpolymers are found in U.S. Pat. No. 3,280,082, and French Pat. No. 1,386,600, which are incorporated herein by reference. The preferred terpolymers contain about 45 to about 75 wt. % ethylene and about 2 to about 10 wt. % of a diene monomer, the balance of the polymer being propylene. More preferably, the polymer contains about 50 to about 70 wt. % ethylene, e.g. 50 wt. % and about 2.6 to about 9.0 wt. % diene monomer, e.g. 5.0 wt. %. The diene monomer is preferably a nonconjugated diene. The $\overline{M}n$ as measured by GPC of the terpolymer is preferably about 10,000 to about 200,000; more preferably about 15,000 to about 100,000; and most preferably about 20,000 to about 60,000. The Mooney viscosity (ML, 1+8, 212° F.) of the terpolymer is preferably 5 to 90, more preferably 10 to 50 and most preferably 15 to 40; e.g., 20. The Mv as measured by GPC of the EPDM is preferably below about 350,000 and more preferably below about 300,000; e.g., 270,000. The $\overline{M}w$ as measured by GPC of the EPDM is preferably below about 500,000 and more preferably below about 350,000, e.g., 343,000.

Illustrative of these nonconjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1+8, 212° F.) of about 40 and having 50 wt. % of ethylene, 45 wt. % of propylene and 5.0 wt. % of 5-ethylidene-2-norbornene with an $\overline{M}n$ as measured by GPC of about 47,000, an $\overline{M}v$ as measured by GPC of about 145,000 and an $\overline{M}w$ as measured by GPC of about 174,000. The Vistalon 2504 can be reprocessed through an extruder to produce a material having a Mooney viscosity of 20.

Vistalon 3708 (Exxon Chemical Co.) is a terpolymer having a Mooney viscosity (ML, 1+8, 260° F.) of about 45-55 and having about 65 wt. % of ethylene, about 33 wt. % of propylene and about 3.7 wt. % 5-ethylidene-2-norbornene with an $\overline{M}n$ as measured by GPC of about 53,000, an $\overline{M}w$ as measured by GPC of about 343,000 and an $\overline{M}v$ as measured by GPC of about 270,000.

Vistalon 6505 (Exxon Chemical Co.) is a terpolymer having a Mooney viscosity (ML, 1+8, 260° F.) of about 45-55 and having about 53 wt. % of ethylene, about 9.0 wt. % of 5-ethylidene-2-norbornene and about 38 wt % of propylene.

Nordel 1320 (DuPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

The olefinically unsaturated polymer is sulfonated with a sulfonating agent selected from an acyl sulfate, a mixture of sulfuric acid and an acid anhydride or a sulfur trioxide donor complexed with a Lewis base containing oxygen, nitrogen or phosphorous.

The term "sulfur trioxide donor" as used in the specification means a compound containing available sulfur trioxide. Illustrative of such sulfur trioxide donors are $SO_3$, chlorosulfonic acid, fluorosulfonic acid, sulfuric acid, oleum, etc. The term "complexing agent" as used in the specification means a Lewis base suitable for use in the practice of this invention, wherein a Lewis base is an electron pair donor. Typical Lewis bases are: dioxane, tetrahydrofuran, tetrahydrothiophene or triethyl phosphate.

The molar ratio of $SO_3$ donor to complexing agent may be as high as 15:1; preferably less than about 9:1, more preferably about 4:1 to about 1:1, e.g. 2:1.

The preferred solvents for preparation of the complexes of sulfur trioxide donor with complexing agents are chlorinated hydrocarbons. Illustrative of such chlorinated solvents are carbon tetrachloride, dichloroethane, chloroform, and methylene chloride. The complexes may also be prepared by direct addition of reagents if precautions are taken to dissipate evolved heat.

The reactions of ethereal complexes of $SO_3$ with the unsaturation of polymer chains has been found to be nonquantitative generally because they are consumed through side reactions with impurities such as water. Therefore, the use of excess complex is desirable to give the required amount of sulfonation.

Other suitable sulfonating agents are the acyl sulfates, which are selected from the group of acetyl, propionyl, butyryl or benzoyl sulfate, in particular acetyl sulfate. The acyl sulfate may be produced by reacting concentrated sulfuric acid with an acid anhydride or an acid halide in the presence or the absence of a solvent. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, acetyl sulfate may be performed by reaction of sulfur trioxide with acetic acid in a non-reactive solvent.

It should be pointed out that neither the sulfonating agent nor the manner of sulfonation is critical, providing that the sulfonation method does not degrade the polymer backbone.

The polymer to be sulfonated is dissolved in a suitable solvent and reacted with the sulfonating agent. The solvent medium must be a neutral one for the rubber and the sulfonating agent. The solvent is preferably an aromatic hydrocarbon, an aliphatic hydrocarbon, a cycloaliphatic hydrocarbon or a halogenated aromatic hydrocarbon. Illustrations of these solvents are: isopentane, pentane, cyclohexane, isohexane, hexane, heptane and homologues thereof, benzene, toluene, chlorobenzene or xylene. The preferred solvent is an aliphatic hydrocarbon.

Sulfonation of the polymer is conducted at a temperature between $-10°$ C. and $-100°$ C. Sulfonation occurs when the sulfonating agent is added to the polymer solution. The sulfonating agent is dissolved in a suitable solvent, or may be added directly without solvent. With acetyl sulfate reagent it is most preferred to add acetic anhydride to the polymer cement and then sulfuric acid to prepare the acetyl sulfate reagent in situ. Reaction time may be about 1 to about 60 minutes, more preferably about 5 to about 45 and most preferably about 15 to about 30, wherein the product remains soluble throughout the reaction period. The unneutralized sulfonated elastomer is quenched with water, or a liquid aliphatic alcohol such as methanol, ethanol or isopropanol, an aromatic hydroxyl compound such as phenol, or a cycloaliphatic alcohol such as cyclohexanol.

The amount of desirable sulfonation depends on the particular application. Preferably, the elastomeric polymer is sulfonated at about 10 to about 60 meq. sulfonate groups/100 g of polymer, more preferably at about 15 to about 50 meq. sulfonate groups/100 g of polymer and most preferably at about 20 to about 40 meq. sulfonate groups/100 g of polymer. The sulfonate content can be determined by either titration of the polymeric sulfonic acid or Dietert Sulfur analysis. In the titration of the sulfonated elastomeric polymer, the polymer is dissolved in solvent consisting of 95 parts of toluene and 5 parts of methanol at a concentration level of 50 grams per liter of solvent. The sulfonated elastomeric polymer is titrated with ethanolic sodium hydroxide to an Alizarin Thymolphthalein endpoint.

Polymers containing unsaturation and unneutralized sulfonate groups have been found to be somewhat deficient in thermostability. Therefore, it is desirable to neutralize at least a portion of the unneutralized sulfonate as part of the manufacturing of sulfonated elastomeric polymer. Neutralization further improves the physical properties of the sulfonated polymer.

In preparing the ionomer, it is not necessary to neutralize every sulfonate group. Preferably, at least 75% of the sulfonate groups are neutralized, though 100% of the sulfonate groups may be neutralized if desired; more preferably about 90 to about 100% of the sulfonate groups are neutralized; most preferably about 95 to about 100% are neutralized.

The neutralizing agents of the present invention are basic salts of carboxylic acids, wherein the cation of the basic salt is selected from the group consisting of Groups IA, IIA, IB, IIB, ammonium, aluminum, lead, iron and antimony of the Periodic Table of Elements and mixtures thereof. Suitable monovalent metal ions are Na, K, Li, Cs, Ag, Hg, and Cu. Suitable divalent metal ions are Be, Mg, Ca, Sr, Ba, Cu, Cd, Hg, Pb, Fe, Hg, and Zn.

The carboxylate ion of the metallic salt is derived from the following carboxylic acids as illustrated in the present invention; however, other carboxylic acids of the same generic class can be readily employed and are considered within the spirit and scope of the present embodiment. These carboxylic acids are: acetic, benzoic, lauric, palmitic, myristic, decanoic, octanoic, and stearic.

Neutralization can also be effected with metallic oxides wherein the metallic ion is selected from the group consisting of Groups IIA, IIB, and lead and mixtures thereof of the Periodic Table of Elements. Illustrative examples are MgO, CaO, BaO, ZnO, $PbO_2$ or $Pb_3O_4$ and mixtures thereof.

Other neutralizing agents are basic salts of hydroxides or alkoxides, wherein the cation is selected from ammonium of Groups IA or IIA of the Periodic Table of Elements and mixtures thereof. Useful examples of hydroxides are $NH_4OH$, $NaOH$, $KOH$, $LiOH$, $Mg(OH)_2$ and $Ba(OH)_2$.

To the neutralized sulfonated terpolymer in solution may be added a preferential plasticizer selected from the group consisting of a carboxylic acid and the ammonium or metal salts of these carboxylic acids, wherein the metal cation of the salt of the carboxylic acid is selected from the group consisting of lead, iron, antimony, aluminum and Groups IA, IIA, IB and IIB of the Periodic Table of Elements thereof. The preferential plasticizer is incorporated into the neutralized sulfonated EPDM terpolymer at less than about 45 parts by weight per 100 parts by weight of sulfonated EPDM, more preferably at about 8 to about 35, and most preferably at about 10 to about 25 (alternatively, other preferential plasticizers are selected from phosphates, amines, amides and ureas and mixtures thereof). The preferred plasticizers are selected from long chain saturated aliphatic carboyxlic acids such as stearic acid and the corresponding metallic salts and mixtures thereof.

The oils employed in the present invention are non-polar backbone process oils having less than about 2 wt. % polar type compounds as measured by molecular type clay gel analysis and at least 12.0 wt. % to less than 59.3 wt. % aromatic constituents. These oils are selected from paraffinics ASTM Type 104B as defined in ASTM D-2226-70, aromatics ASTM Type 102 or naphthenics ASTM Type 104A wherein the oil has a flash point by the Cleveland open cup of at least 350° F., a pour point of less than 40° F., a viscosity of about 70 to about 3000 s.s.u.'s and a number average molecular weight of about 300 to about 1000, more preferably 300 to 750. The preferred process oils are paraffinics. Table I illustrates typical oils encompassed by the scope of this invention. The preferred process oil is a paraffinic type having an $\overline{M}n$ of at least about 300.

The process oil is preferably incorporated into the elastomeric product at less than 150 parts by weight per 100 parts by weight of the neutralized sulfonated elastomeric polymer, more preferably at about 25 to about 100, and most preferably at about 40 to about 100.

TABLE I

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Naphthenic | Sunthene 4240 | 2206 | — | 1.1 | 43.9 | 55.0 |

The fillers employed in the present invention are selected from talcs, ground calcium carbonate, water precipitated calcium carbonate, or delaminated, calcined or hydrated clays and mixtures thereof. These fillers are incorporated into the blend composition at about 25 to about 350 parts per hundred, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table II.

TABLE II

| Filler | Code # | Oil Absorption grams of oil/100 grams of filler | Specific gravity | Avg. Particle Size Micron | pH |
|---|---|---|---|---|---|
| calcium carbonate ground | Atomite | 15 | 2.71 | | 9.3 |
| calcium carbonate precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| aluminum silicate | Mistron Vapor | 60–70 | 2.75 | 2 | 9.0–7.5 |

Crystalline polyolefinic thermoplastic resins cannot be incorporated into the elastomeric blend compositions of the instant invention because even in minor amounts the crystalline polyolefinic thermoplastic resins will adversely affect the elasticity and hardness of the elastomeric blend compositions, thereby increasing adversely the stiffness of the formed elastomeric blend composition. Crystalline polyolefinic thermoplastic resins are alpha olefin polymers having a molecular weight of at least 2,000 and include polybutene polypropylene as well as low and high density polyethylene and copolymers thereof.

The improved solution process for the formation of these sulfonated elastomeric blend compositions of a process oil and the neutralized sulfonated elastomeric polymer comprises dissolving an elastomeric polymer in a hydrocarbon solvent to form a cement. The polymer in the cement is sulfonated with a sulfonating agent to form an acid form of a sulfonated elastomeric polymer. The cement of the acid form of the sulfonated elastomeric polymer is quenched with an aliphatic alcohol to form a solution of the acid form of the sulfonated elastomeric polymer. The acid form of the sulfonated elastomeric polymer in solution is neutralized with a neutralizing agent to form the neutralized sulfonated elastomeric polymer in solution. A process oil is added under agitation to the solution of the neutralized sulfonated elastomeric polymer to form an elastomeric blend of the process oil and the neutralized sulfonated elastomeric polymer in solution. The elastomeric blend is recovered from the solution by steam stripping or other suitable recovery techniques.

DETAILED DESCRIPTION

The advantages of the improved process of manufacture of these improved elastomeric blends may be more readily appreciated by reference to the following examples.

EXAMPLE 1—PREPARATION OF OIL EXTENDED SULFONATED EPDM

One hundred grams of an EPDM terpolymer (Vistalon 2504-20) was dissolved in 1000 ml. of n-hexane at 40° C. The EPDM had approximately 50% ethylene, 45% propylene and 5% 5-ethylidene-2-norbornene and a Mooney viscosity (ML, 1+8, 212° F.) of 20. After the cement was cooled to room temperature, 5.74 ml. of acetic anhydride (60.75 mmoles) was added. While stirring the mixture, 2.1 ml. of 95% $H_2SO_4$ (37.5 mmoles) was added dropwise. The sulfonated reaction was quenched after 30 minutes with 150 ml. of isopropanol. The acid form of the sulfonated polymer was analyzed by Dietert Sulfur Analysis to have 33 meq. of $SO_3H$ groups per 100 grams of polymer. A solution of 9.86 grams (90 meq./100 g EPDM) of zinc acetate dihydrate dissolved in 25 ml. of distilled water was then added in the cement and the cement stirred for an additional 30 minutes. Antioxidant 2246 (0.5 grams) was then added to the cement. The sulfonated neutralized polymer in cement will be designated (A).

A paraffinic process oil, Sunpar 2280, was next added at a level of 50 grams (50 phr) to the cement. The resulting oil extended neutralized sulfonated EPDM terpolymer (B) was then isolated by steam stripping and forced air drying. Composition (B) was found to be a free flowing polymer crumb.

The precursor EPDM terpolymer (Vistalon 2504-20) will be designated as (C). To (C) was added 50 phr of Sunpar 2280 on a two roll rubber mill. The resulting composition (D) was extremely soft and tacky and required scraping from the mill. Both compositions C and D were observed to cold flow on a table top under their own weight within minutes.

Compositions A and B were placed in 55 gal. drums and examined one month later. Surprisingly, the material at the bottom of the drums exhibited no cold flow behavior and was essentially identical to that at the top. Preoil extension of the sulfonated elastomer had not altered its excellent cold flow characteristics.

EXAMPLE 2

A neutralized sulfonated EPDM terpolymer cement was prepared according to composition (A) in Example 1. To the cement was added stearic acid under agitation at a level of 90 meq./100 g of EPDM. The cement was then divided into three aliquots into which were added 0, 25, and 75 grams/100 grams of EPDM of a paraffinic process oil—Sunpar 2280. The resulting compositions were isolated by steam stripping and drying.

The dried compositions were compression molded at 350° F. for 5 minutes. Tensile stress-strain measurements were performed on micro-tensile specimens cut from the molded pads. The measurements were made at an elevated temperature, 70° C., in order to examine the expected reduction in physical properties due to oil extension. To complement the tensile data, thermal mechanical analysis (TMA) was performed on the molded pads to investigate the softening behavior due to oil extension. The results of both measurements are shown in Table III.

TABLE III
EFFECT OF OIL EXTENSION ON PHYSICAL PROPERTIES

| Sample (g/Oil/100g EPDM) | Stress/Strain at 70° C. | | Softening Points, TMA | |
|---|---|---|---|---|
| | 100% Modulus psi | Tensile Strength psi | $T_1$ | $T_2$ |
| No oil | 84 | 100 | 44 | 105 |
| 25 pts. oil | 58 | 75 | 42 | 103 |
| 75 pts. oil | 27 | 28 | 37 | 92 |

It is readily apparent from the data above that at these oil levels, the softening points are sufficiently high and that the oil extended gums have considerable resistance to deformation at 70° C. and thus have excellent cold flow characteristics. It is observed that there are two inflection points in the TMA curves above room temperature. It is surprisingly observed that both inflection points are not appreciably affected by the incorporation of considerable oil content (75 phr). However, the tensile stress strain behavior indicates that the upper limit of approximately 100 phr of oil for this particular neutralized and plasticized sulfonated EPDM terpolymer is practical. Above this level of oil extension the physical properties would be sufficiently reduced to minimize the excellent properties of oil extended compositions. Thus a practical upper limit has been established and this example has illustrated that below this upper limit the oil extended plasticized and neutralized EPDM terpolymers exhibit surprisingly good tensile properties.

EXAMPLE 3

This example will demonstrate the effect of oil extension on the rheological characteristics of several sulfo-EPDM gums. Throughout these studies an Instron Capillary Rheometer was employed to measure melt flow characteristics. Apparent viscosity values at various shear rates were determined at 200° C. and used to characterize the flow behavior. A further characterization parameter which is obtained from these measurements is melt fracture. This is defined as the shear rate where the extrudate was clearly irregular in appearance and, therefore, of demonstrably nonuniform flow. It is the intent of this example to describe the changes in the rheological characteristics of several sulfonated ethylene-propylene terpolymer gums attributable to oil extension.

The sulfonated elastomers used in this experiment were derived from an ethylene-propylene 5-ethylidene-2-norbornene (ENB) terpolymer compositionally comprising about 50% ethylene, 45% propylene and 5% ENB. Said polymer had a Mooney viscosity at 212° F. of about 20. The sulfonic acid levels are given in the tables in terms of meq. of acid/100 g polymer and the neutralizations of said acids were performed in solution with 3 equivalents of metal acetate per equivalent of sulfonic acid to insure complete neutralization.

Two oils have been employed in this study. The oil designated as Flexon 845 is classified by the ASTM as a 104B type. The carbon type analysis characterizes this oil as 2% aromatic carbon, 29% naphthenic carbon and 69% paraffinic carbon. The oil designated as Sunpar 2280 is in the same class and is characterized as 4% aromatic carbon, 23% naphthenic carbon, and 73% paraffinic carbon. Both of these oils can be classified as paraffinic process oils.

The sulfonated EPDM systems investigated are described as containing 30 meq. sulfonate/100 g EPDM and both a magnesium and zinc neutralized form were employed. As shown in Table IV, the introduction of approximately 50 phr (parts per hundred rubber) of a process oil converts an essentially intractable material into a material which is coherent under shear and possesses markedly reduced melt viscosity.

TABLE IV

| Sulfonation Level Meq./100g EPDM | Neutralization Agent | Oil Type | Oil Level phr | Apparent Viscosity, poise × $10^5$ | | | | Melt Fracture $sec^{-1}$ | Comments on Strand Quality |
|---|---|---|---|---|---|---|---|---|---|
| | | | | .74 $sec^{-1}$ | 7.4 $sec^{-1}$ | 74 $sec^{-1}$ | 740 $sec^{-1}$ | | |
| 30 | Mg(Ac)$_2$ | — | — | 48.0 | 7.1 | .95 | .15 | .3 | Incoherent when >73 $sec^{-1}$ |
| 30 | Mg(Ac)$_2$ | Flexon 845 | 54 | 12.3 | 2.1 | .34 | .05 | 7.4 | Incoherent when >1400 $sec^{-1}$ |
| 30 | Zn(Ac)$_2$ | — | — | 22.3 | 5.1 | .94 | .15 | 29 | Coherent @ 740 $sec^{-1}$ |
| 30 | Zn(Ac)$_2$ | Sunpar 2280 | 50 | 6.5 | 1.6 | .34 | .06 | 146 | Coherent @ 1400 $sec^{-1}$ |

Surprisingly, it has been observed that the oil extended gums of this invention can maintain their improved rheological behavior at elevated temperatures, and yet at ambient temperatures they do not cold flow or agglomerate in the way that uncured elastomers (such as EPDM of low ethylene content and low Mooney level) commonly do. Simultaneously, these oil extended compositions tend to be softer than the unextended gums which makes their behavior even more remarkable.

The introduction of this level of oil into Sulfo EPDM gums can be effected with both plasticized gums and unplasticized gums. The beneficial effects on melt viscosity are much more beneficial in the unplasticized gums; however, there are also significant benefits in the cases of those gums which contain polar plasticizers to help in the dissociation of the ionic groups under mixing or fabrication conditions. The effect of oil extension with a stearic acid plasticized gum is shown in Example 2.

EXAMPLE 4—COMPOUND BASED ON OIL EXTENDED SULFO-EPDM TERPOLYMER

A sulfonated neutralized EPDM terpolymer cement was prepared as in Example 1, Composition A. To the cement was added 45 meq./100 g EPDM of stearic acid and 37 phr of a paraffinic rubber process oil—Sunpar 180. The oil extended neutralized sulfonated EPDM was isolated by steam stripping and drying.

The oil extended gum described above is particularly desirable for use in developing high flow, soft compounds. For example, 150 parts of this composition can be combined with 70 parts of a paraffinic process oil such as Sunpar 2280 and 75 parts of a mineral filler such as ground calcium carbonate in a Banbury or similar intensive mixing machine. Mixing cycles of 5 to 10 minutes are sufficient to produce a homogeneous compound with excellent physical and rheological properties. On the other hand, using an identical gum without the pre-oil extension would require the addition of a larger quantity of oil (107 phr) relative to the gum during the mixing operation which would be difficult to mix into the neutralized sulfonated gum homogeneously. Mixing times can increase by a factor of two, thus requiring both additional time and energy. Furthermore, the resulting compositions would not appear homogeneous as evidenced by erratic physical properties, i.e. low tensile elongations, variations in physical properties dependent on location of tensile specimen, and poor tear resistance. Thus, the use of pre-oil extended sulfonated EPDM compositions are particularly preferred for compounds which have high oil extension and generally are soft.

What is claimed is:

1. An elastomeric blend composition consisting of:
   (a) a neutralized sulfonated EPDM terpolymer having about 15 to about 50 meq. of neutralized sulfonate groups per 100 grams of said terpolymer, said neutralized groups having a metal or ammonium counterion, said neutralized sulfonated EPDM terpolymer being formed from an EPDM terpolymer having a Mooney viscosity (M.L. 1+8, 212° F.) of about 10 to about 50; and
   (b) about 25 to about 150 parts by weight of a non-polar process oil per 100 parts of said neutralized sulfonated EPDM terpolymer, said non-polar process oil having less than 2 wt. % polar-type compounds and about 12.0 to less than 59.3 wt. % aromatic constituents.

2. A composition according to claim 1 wherein said concentration of said non-polar process oil is less than about 100 parts by weight per 100 parts by weight of said neutralized sulfonated elastomeric polymer.

3. A composition according to claim 1 wherein said process oil has an $\overline{M}n$ of about at least 300.

4. A composition according to claim 1 wherein said process oil is selected from the group consisting of paraffinics, naphthenics and aromatics.

5. A composition according to claim 1 wherein said process oil is a paraffinic having an $\overline{M}n$ of at least about 300.

6. A composition according to claim 1 wherein said EPDM terpolymer consists essentially of about 45 to about 75 wt. % of ethylene, from about 10 to about 53 wt. % of an alpha-olefin, and about 2 to about 10 wt. % of a diene monomer.

7. A composition according to claim 6 wherein said alpha-olefin is propylene.

8. A composition according to claim 6 wherein said diene is selected from the group consisting of 1,4-hexadiene, dicyclopentadiene, 5-ethylidene-2-norbornene, 5-methylene-2-norbornene, 5-propenyl-2-norbornene and methyl tetrahydroindene.

9. A composition according to claim 1 wherein said neutralizing agent is an ammonium salt or a metallic salt of a carboxylic acid, a metal ion of said metallic salt being selected from the group consisting of iron, lead, antimony and Groups IA, IIA, IB and IIB of the Periodic Table of Elements and mixtures thereof.

10. An elastomeric blend composition consisting of:
    (a) a neutralized sulfonated EPDM terpolymer having about 15 to about 50 meq. of neutralized sulfonate groups per 100 grams of said neutralized sulfonated EPDM terpolymer, said neutralized sulfonate groups having a metal or ammonium counterion, said neutralized sulfonated EPDM terpolymer being formed from an EPDM terpolymer having a Mooney viscosity (M.L. 1+8, 212° F.) of about 10 to about 50; and
    (b) about 25 to about 150 parts by weight of a non-polar process oil per 100 parts by weight of said neutralized sulfonated EPDM terpolymer, said non-polar process oil having less than 2 wt. % polar-type compounds and about 12.0 to less than 59.3 wt. % aromatic constituents; and
    (c) less than about 45 parts by weight of a preferential plasticizer per 100 parts by weight of said sulfonated EPDM terpolymer.

11. A composition according to claim 10 wherein said preferential plasticizer is selected from the group consisting of carboxylic acids, metallic salts of said carboxylic acids, phosphates, ureas, amides and amines and mixtures thereof.

12. A composition according to claim 11 whereing said preferential plasticizer is a combination of stearic acid and a metallic salt of said stearic acid, a metal ion of said metallic salt being selected from the group consisting of lead, iron, antimony and Groups IA, IIA, IB and IIB of the Periodic Table of Elements and mixtures thereof.

13. An elastomeric article formed from an elastomeric composition consisting of:
    (a) a neutralized sulfonated EPDM terpolymer having about 15 to about 50 meq. neutralized sulfonate groups per 100 groups of said terpolymer, said neutralized sulfonate groups having a metal or ammonium counterion, said neutralized sulfonated EPDM terpolymer being formed from an EPDM terpolymer having a Mooney viscosity (M.L. 1+8, 212° F.) of about 10 to about 50; and
    (b) about 25 to about 150 parts by weight of a non-polar process oil per 100 parts by weight of said terpolymer, said non-polar process oil having less than 2 wt. % polar-type compounds and about 12 to less than 59.3 wt. % aromatic constituents.

14. An article according to claim 13 wherein said concentration of said process oil is less than about 100 parts by weight per 100 parts of said sulfonated EPDM terpolymer.

15. An article according to claim 13 wherein said process oil has an $\overline{M}n$ of about at least 300.

16. An article according to claim 13 wherein said process oil is selected from the group consisting of paraffinics, naphthenics and aromatics.

17. An article according to claim 13 wherein said process oil is a paraffinic having an $\overline{M}n$ of at least about 300.

18. An article according to claim 13 wherein said sulfonated EPDM terpolymer is formed from an EPDM terpolymer having a Mooney viscosity (212° F., M.L., 1+8) of about 10 to about 50.

19. An article according to claim 18 wherein said EPDM terpolymer consists essentially of about 45 to about 75 wt. % of ethylene, from about 10 to about 53 wt. % of an alpha-olefin, and about 2 to about 10 wt. % of a diene monomer.

20. An article according to claim 19 wherein said alpha-olefin is propylene.

21. An article according to claim 20 wherein said diene is selected from the group consisting of 1,4-hexadiene, dicyclopentadiene, 5-ethylidene-2-norbornene, 5-methylene-2-norbornene, 5-propenyl-2-norbornene and methyl tetrahydroindene.

22. An article according to claim 13 wherein said neutralizing agent is an ammonium salt or a metallic salt of a carboxylic acid, a metal ion of said metallic salt being selected from the group consisting of iron, lead, antimony and Groups IA, IIA, IB and IIB of the Periodic Table of Elements and mixtures thereof.

23. An elastomeric article formed from an elastomeric composition consisting of:

(a) a neutralized sulfonated EPDM terpolymer having about 15 to about 50 meq. of neutralized sulfonate groups per 100 grams of said terpolymer, said neutralized sulfonate groups having a metal or ammonium counterion, said neutralized sulfonated EPDM terpolymer being formed from an EPDM terpolymer having a Mooney viscosity (M.L. 1+8, 212° F.) of about 10 to about 50; and (b) about 25 to about 150 parts by weight of a non-polar process oil per 100 parts by weight of said terpolymer, said non-polar process oil having less than 2 wt. % polar-type compounds and about 12 to less than 59.3 wt. % aromatic constituents; and (c) a preferential plasticizer at a concentration level of less than about 45 parts by weight per 100 parts by weight of the neutralized sulfonated EPDM terpolymer.

24. An article according to claim 23 wherein said preferential plasticizer is selected from the group consisting of carboxylic acids, metallic salts of said carboxylic acids, phosphates, ureas, amides and amines and mixtures thereof.

25. An article according to claim 23 wherein said preferential plasticizer is a combination of stearic acid and a metallic salt of said stearic acid, a metal ion of said metallic salt being selected from the group consisting of lead, iron, antimony, or Groups IA, IIA, IB and IIB of the Periodic Table of Elements and mixtures thereof.

* * * * *